United States Patent
Lu et al.

(10) Patent No.: US 6,832,051 B2
(45) Date of Patent: Dec. 14, 2004

(54) DISPERSION MANAGED OPTICAL TRANSMISSION LINKS FOR WAVELENGTH DIVISION MULTIPLEXED SYSTEMS

(75) Inventors: Zhuo Jun Lu, Nepean (CA); Kee Leng Wah, Kanata (CA)

(73) Assignee: Nortel Networks Limited, Quebec (CA)

( * ) Notice: Subject to any disclaimer, the term of this patent is extended or adjusted under 35 U.S.C. 154(b) by 635 days.

(21) Appl. No.: 09/726,029

(22) Filed: Nov. 30, 2000

(65) Prior Publication Data

US 2004/0170436 A9 Sep. 2, 2004

Related U.S. Application Data

(63) Continuation-in-part of application No. 09/608,137, filed on Jun. 30, 2000, now Pat. No. 6,330,381.

(51) Int. Cl.[7] .................................................. H04B 10/00
(52) U.S. Cl. ....................... 398/158; 398/159; 398/147; 398/140; 398/141; 398/148; 398/79; 398/81; 398/82; 398/25; 398/26; 398/27; 398/29; 385/24; 385/37; 385/123; 385/128
(58) Field of Search ................................. 398/147, 140, 398/158, 141, 159, 148, 25, 79, 26, 81, 27, 82, 29; 385/24, 123, 128, 37

(56) References Cited

U.S. PATENT DOCUMENTS

| | | | | |
|---|---|---|---|---|
| 6,188,823 B1 | * | 2/2001 | Ma | 385/123 |
| 6,229,935 B1 | * | 5/2001 | Jones et al. | 385/24 |
| 6,317,238 B1 | * | 11/2001 | Bergano et al. | 398/147 |
| 6,330,381 B1 | * | 12/2001 | Lu et al. | 385/24 |
| 6,433,923 B2 | * | 8/2002 | Tanaka et al. | 359/337 |
| 6,567,577 B2 | * | 5/2003 | Abbott et al. | 385/24 |

* cited by examiner

Primary Examiner—Hanh Phan
(74) Attorney, Agent, or Firm—Guerin & Rodriguez, LLP; William G. Guerin

(57) ABSTRACT

A dispersion managed link for transmitting wavelength division multiplexed (WDM) optical signals and method for providing the link are disclosed. The link includes a plurality of spans serially connected by optical amplifiers. Each span includes an optically dispersive fiber connected to a dispersion compensating module (DCM). The fibers and DCMs are selected in accordance with a preferred dispersion map, which represents dispersion along the link, such that points of minimum and maximum dispersion have distributions that change in accordance with one another. The effects of self-phase modulation (SPM), inter-symbol interference (ISI), and cross-phase modulation on the signals are minimized. The preferred dispersion map may be one of ramp type, angular type or arcuate type, and in the case of the latter two, it may have a plurality peaks.

3 Claims, 18 Drawing Sheets

DISPERSION MANAGED OPTICAL TRANSMISSION LINKS FOR WAVELENGTH DIVISION MULTIPLEXED SYSTEMS

CROSS REFERENCE TO RELATED APPLICATIONS

This application is a continuation-in-part of application Ser. No. 09/608,137, filed Jun. 30, 2000, now U.S. Pat. No. 6,330,381, issued Dec. 11, 2001.

FIELD OF THE INVENTION

This invention relates to Wavelength Division Multiplexed (WDM) optical transmission systems and more particularly to dispersion managed return-to-zero (RZ) WDM systems.

BACKGROUND OF THE INVENTION

Dispersion managed WDM systems have been widely studied for use in large capacity digital transmission systems. Such dispersion managed systems typically involve a WDM optical system that includes a plurality of dispersion managed optical transmissions links. Each of these dispersion managed links includes one or more spans of dispersive fibers, the dispersion of which is compensated by a dispersion compensation module (DCM) connected between adjacent spans.

Dispersion management has proven to be an effective method for increasing the capacity of RZ WDM systems. Achieving improved system performance usually involves the creation of dispersion maps under a given set of predetermined system constraints, such as transmission rate, pulse width, peak power, and amplifier spacing.

A dispersion map shows, in a transmission link, the relationship between accumulated dispersion and distance, at a given wavelength. This relationship affects the quality of optical signals as they travel along the link, hence affecting the system performance.

In a WDM system, dispersion compensation is required not only at one wavelength, but rather at a wide range of wavelengths. To achieve this, the relative dispersion slope (RDS) of the transmission fibers and DCMs must be properly matched. When the RDSs of the fibers and DCMs are equal, dispersion compensation can be achieved simultaneously for all wavelengths. At the end of the transmission link there is no residual slope on the accumulated dispersion with respect to wavelength. However, if the RDSs are mismatched, a residual slope develops, such that the shape of the dispersion map varies with wavelength. Residual slope also causes variation in the dispersion maps. This variation becomes an important factor in WDM system optimization.

Major system impairments are due to non-linear effects such as self-phase modulation (SPM) and inter-symbol interference (ISI), which are chief concerns in single-channel systems, as well as cross-phase modulation (XPM) and four wave mixing (FWM), which additionally affect multi-channel systems. In known WDM systems, dispersion managed links that minimize SPM tend to maximize XPM, and vice versa. Without addressing the trade-off between SPM, ISI, and XPM effects, the overall performance of the WDM system can be penalized.

SUMMARY OF THE INVENTION

It is an object of the present invention to provide an improved dispersion managed link for RZ WDM optical systems.

The selection of the fibers and DCMs for the improved link is directed to minimizing the maximum combined effect, occurring at a WDM wavelength, of SPM, ISI and XPM. In this way the invention addresses the trade-off between SPM, ISI, and XPM effects.

According to an aspect of the present invention there is provided a dispersion managed link for transmitting wavelength division multiplexed optical signals having a range of predetermined wavelengths and a center wavelength. The link includes a plurality of spans, each span having a length of optically dispersive fiber and a dispersion compensating module connected to the fiber. The link also includes a plurality of optical amplifiers, each optical amplifier serially connecting adjacent spans. Each span has a maximum dispersion and a minimum dispersion at the center wavelength. The maximum and minimum dispersions have respective distributions of maximum and minimum dispersion. The distributions have one or more portions where the maximum dispersions are changing in accordance with the minimum dispersions for changes in location along the link, whereby a maximum combined effect of self-phase modulation, inter-symbol interference, and cross-phase modulation within the range is minimized.

Embodiments of this aspect of the invention have less adverse effects on the Q-value of signals transmitted over them than do traditional dispersion managed links. This leads to an improvement in overall performance of WDM optical systems that employ these improved links.

According to another aspect of the present invention there is provided a method of providing a dispersion managed link for a wavelength division multiplexed optical transmission system having a plurality of predetermined wavelengths one of which is a center wavelength. The link includes a plurality of serially connected spans. Each span has a length of optically dispersive fiber connected to a dispersion compensating module and is connected to an adjacent span by an optical amplifier. The method comprises the steps of:

a. selecting one of a ramp type, angular type or arcuate type dispersion map for representing dispersion on the link;
b. generating a set of dispersion maps, of the type selected, at the center wavelength;
c. simulating, for each map in the set, each wavelength to obtain a performance indicator of that wavelength;
d. determining, for each map in the set, which one of the performance indicators is the minimum performance indicator;
e. selecting the map with the greatest minimum performance indicator; and
f. selecting dispersive fibers and dispersion compensating modules for each span in accordance with the selected map.

Embodiments of this aspect of the invention provide dispersion managed links that have less adverse effects on the Q-value of signals transmitted over them than do traditional dispersion managed links. By selecting the map with the greatest minimum performance indicator, the maximum combined effect, occurring at one of the predetermined wavelengths, of self-phase modulation, inter-symbol interference, and cross-phase modulation is minimized. This leads to an improvement in overall performance of WDM optical systems that employ these improved links.

BRIEF DESCRIPTION OF THE DRAWINGS

The invention will be further understood from the following detailed description of the embodiments of the invention with reference to the accompanying drawings, in which.

DETAILED DESCRIPTION

Figure 1:
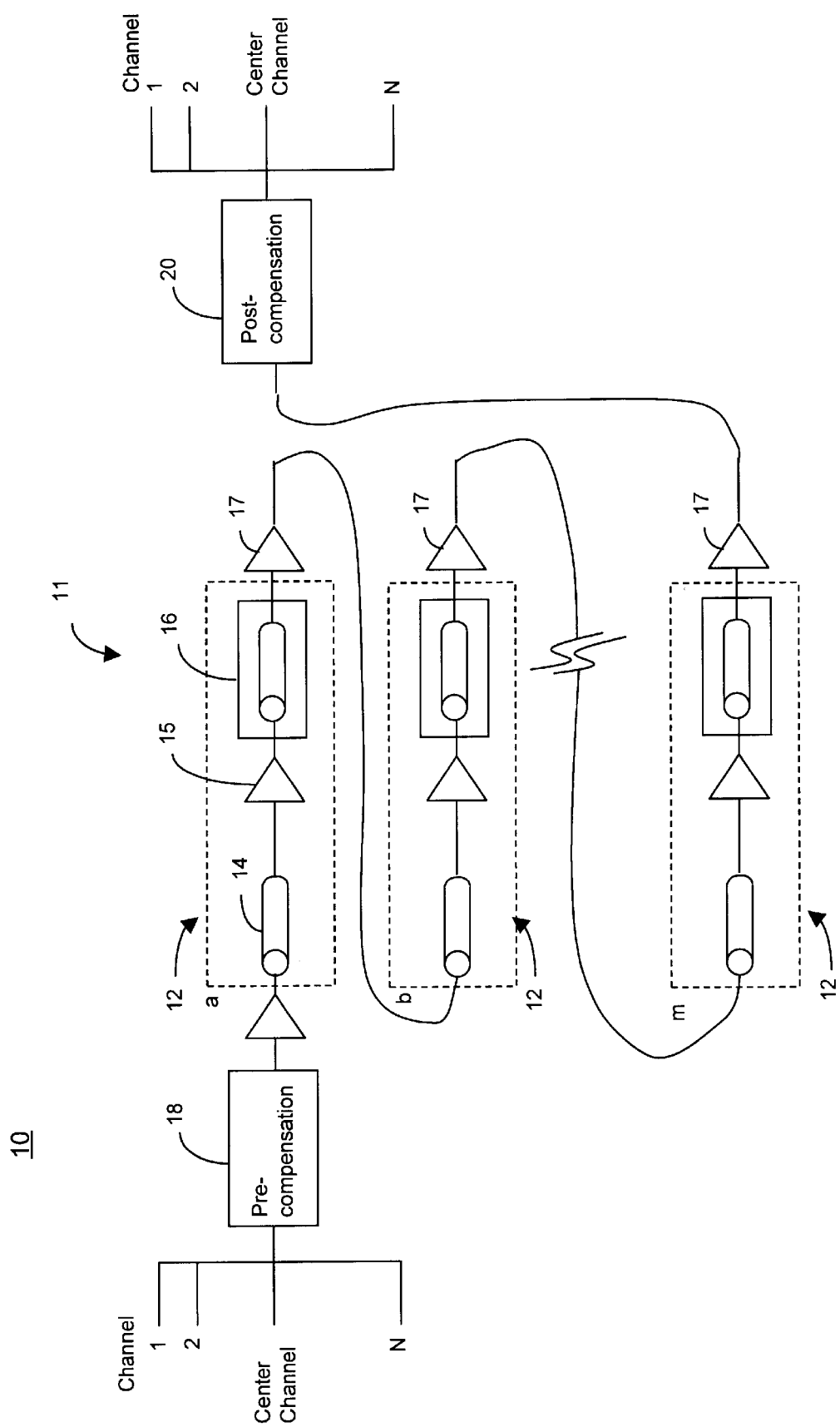
FIG. 1 is a schematic diagram of a dispersion managed RZ WDM system.

Referring to FIG. 1, an optical transmission system having N WDM channels is shown generally at 10. The system has a dispersion managed link 11, which includes a plurality (a–m) of spans 12. Each span 12 includes a length $L_i$ of an optical medium 14, such as fiber optic cable having a dispersion parameter $D_i$, and a dispersion compensation module (DCM) 16 connected to the medium 14 by a first optical amplifier 15. The first optical amplifier 15 is optional although it is usually required to obtain good performance, especially when the length of the optical medium 14 is long, for example eighty kilometers (i.e. $L_i$=80 km). Each span 12 is serially connected to an adjacent span 12 by a second optical amplifier 17. The first and second optical amplifiers (15,17) could be Erbium Doped Fibre Amplifiers (EDFA)s, for example. Each dispersion compensation module 16, having a dispersion parameter $d_i$ and a length $l_i$, compensates the dispersion of the optical medium 14 in its span 12, at (or near) the center wavelength of the optical system. Where a WDM system has an odd number of wavelengths the center wavelength will be in the middle of the wavelength range, and for a system with an even number of wavelengths the center wavelength will be one of two wavelengths at the middle of the wavelength range. The system 10 also includes a pre-compensation device 18 and a post compensation device 20, to provide pre-compensation and post-compensation in dispersion, respectively, for improving overall system performance.

Figure 2:
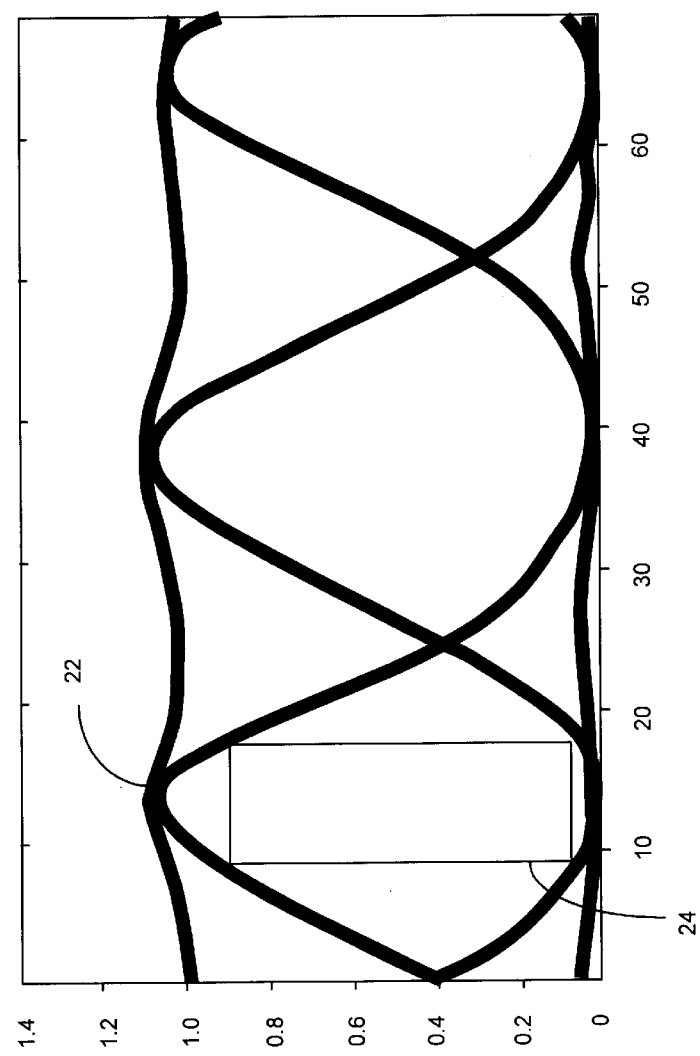
FIG. 2 is an eye diagram produced by a mathematical model of the system of FIG. 1.

FIG. 2 is an eye diagram 22 of a received channel signal. The eye diagram 22 has been produced through simulation using a model of the system 10 of FIG. 1. The open region 24 of the eye diagram 22 provides a measure of the Q-value of the received signal. The Q-value affects the bit error rate (BER) and hence the performance, or conversely the penalties, of the system 10. The Q-value is hereinafter expressed in decibels (dB) as dBQ.

Figure 3:
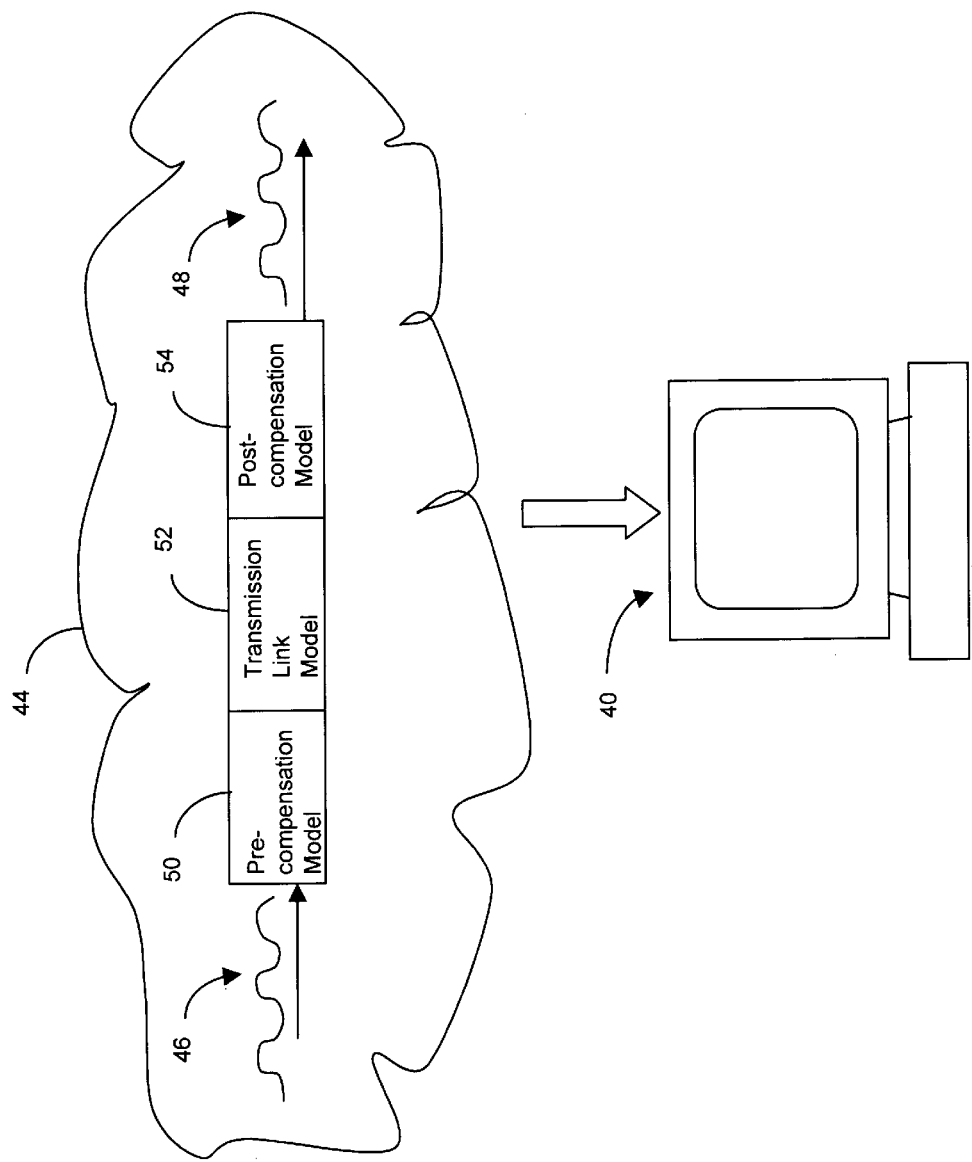
FIG. 3 is a schematic representation of a computer operating a mathematical model of the system of FIG. 1.

Referring to FIG. 3, to produce the eye diagram 22 by computer modelling, a computer 40 is suitably configured to receive data relating to the dispersion parameters and length of the optical medium 14 and the DCM 16 in each span 12 of a mathematically implemented representation of the system 10. Data providing pre-compensation and post-compensation values for the link 11 in the representation of the system 10 is also provided.

The computer 40 is programmed to mathematically implement the optical system 10 by a model 44 of the signal transmission characteristics of the optical system 10, given a configuration of optical mediums 14 and DCMs 16, which correspond to a particular dispersion map.

The model 44 includes a pre-compensation stage 50 a transmission link stage 52 and a post-compensation stage 54. The pre-compensation stage 50 is operable to provide pre-compensation to representations of input pulses 46 provided to the model 44. The transmission link stage 52 receives the pre-compensated input pulse representations and performs dispersion on them according to the particular dispersion map. The post-compensation stage 54 receives the dispersed representations and performs post-compensation on them, in terms of dispersion, before outputting them as representations of output pulses 48.

In summary, the computer 40 provides single channel and multi-channel simulations in such a manner that representations of input pulses 46 may be provided to the model 44 such that the model produces representations of output pulses 48. More particularly, it is desirable that the computer 40 be programmed to produce an eye diagram 22 of the type shown in FIG. 2, for example, or to produce a representation of received signal quality in terms of Q-value.

Figure 4:
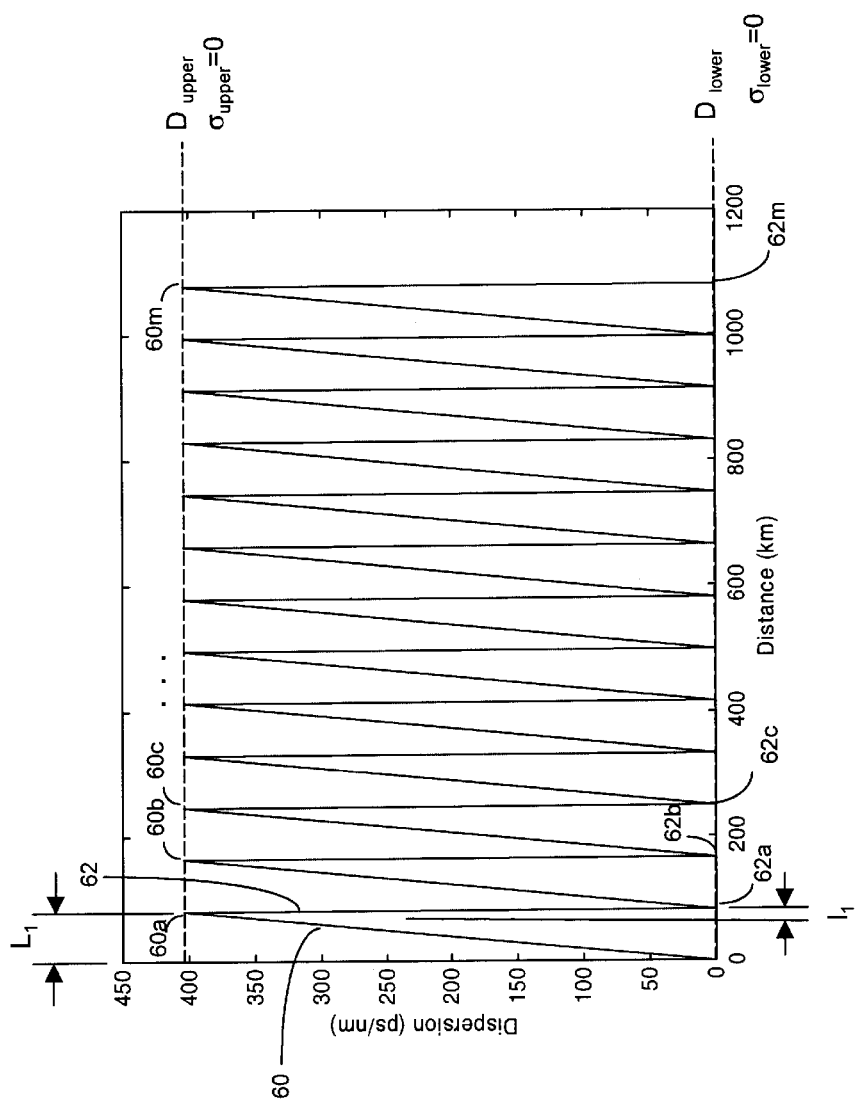
FIG. 4 is a dispersion map of TrueWave™ Classic (TWC) fiber at a wavelength of 1590 nm.

FIG. 4 is a dispersion map of TWC fiber at a wavelength of 1590 nm. Dispersion maps show, for a particular wavelength, the accumulated dispersion caused by the link 11 versus distance. In FIG. 4 the accumulated dispersion for the first length $L_1$ of the optical medium 14 is shown as first line segment 60, which has a positive slope corresponding to the positive dispersion parameter $D_1$ of the optical medium 14. The second line segment 62 shows the accumulated dispersion for the first DCM 16 of the same span 12. Note that the second segment 62 has a negative slope corresponding to the negative dispersion parameter $d_1$ and length $l_1$ of the first DCM 16.

A dispersion map can be characterized by the following parameters:

Accumulated dispersion at the end of each fiber span i, referred to as $D_{upper}(i)$, where:

$$D_{upper}(i) = D_i L_i + \sum_{k=1}^{i-1}(D_k L_k + d_k l_k)$$

and $D_i$ and $L_i$ are, respectively, the dispersion and the length of the fiber in span i; and $d_i$ and $l_i$ are, respectively, the dispersion and the length of the dispersion compensating fiber in the DCM 16 of span i.

Accumulated dispersion at the end of each DCM at span i, referred to as $D_{lower}(i)$, where:

$$D_{lower}(i) = \sum_{k=1}^{i}(D_k L_k + d_k l_k)$$

The standard deviation of $D_{upper}$, referred to as $\sigma_{upper}$ and the standard deviation of $D_{lower}$, referred to as $\sigma_{lower}$.

FIG. 4 shows the accumulated dispersion at the end of each fiber 14 by the dashed line, labelled $D_{upper}$, the slope of which is zero. Similarly, a dashed line, labelled $D_{lower}$, also having a slope of zero, shows the accumulated dispersion at the end of each DCM 16. Accordingly, the standard deviation $\sigma_{upper}$ of the points $D_{upper}(i)$ is zero, as well as the standard deviation $\sigma_{lower}$ of the points of $D_{lower}(i)$. It should be clear that the line $D_{upper}$ traces the distribution of the points of maximum dispersion on the link 11, while the line $D_{lower}$ traces the distribution of points of minimum dispersion on the link 11. Note that $\sigma_{upper}$ and $\sigma_{lower}$ are zero in order to achieve best system performance in a single channel system.

The method of providing a dispersion managed link involves selecting a set of dispersion compensation modules (DCMs) 16, and transmission fibers 14, in accordance with a preferred dispersion map of the link 11. Creating the preferred dispersion map involves analyzing, through simulations, the single and multi-channel system penalties of different dispersion maps, and balancing the overall penalties in the range of WDM wavelengths by adjusting the shape of the dispersion maps. This adjustment is done by varying the dispersion parameters ($D_i$,$d_i$) and length ($L_i$,$l_i$) of the fibers 14 and DCMs 16, respectively.

$D_{upper}$ is shown in FIG. 4 as the upper limit of the dispersion map consisting of locations (60a–60m) having maximum dispersion, while $D_{lower}$ is the lower limit of the dispersion map consisting of locations (62a–62m) having minimum dispersion. The locations of maximum dispersion (60a–60n) are immediately before each DCM 16 and the locations of minimum dispersion (62a–62m) are immediately after each DCM 16.

Figure 5:
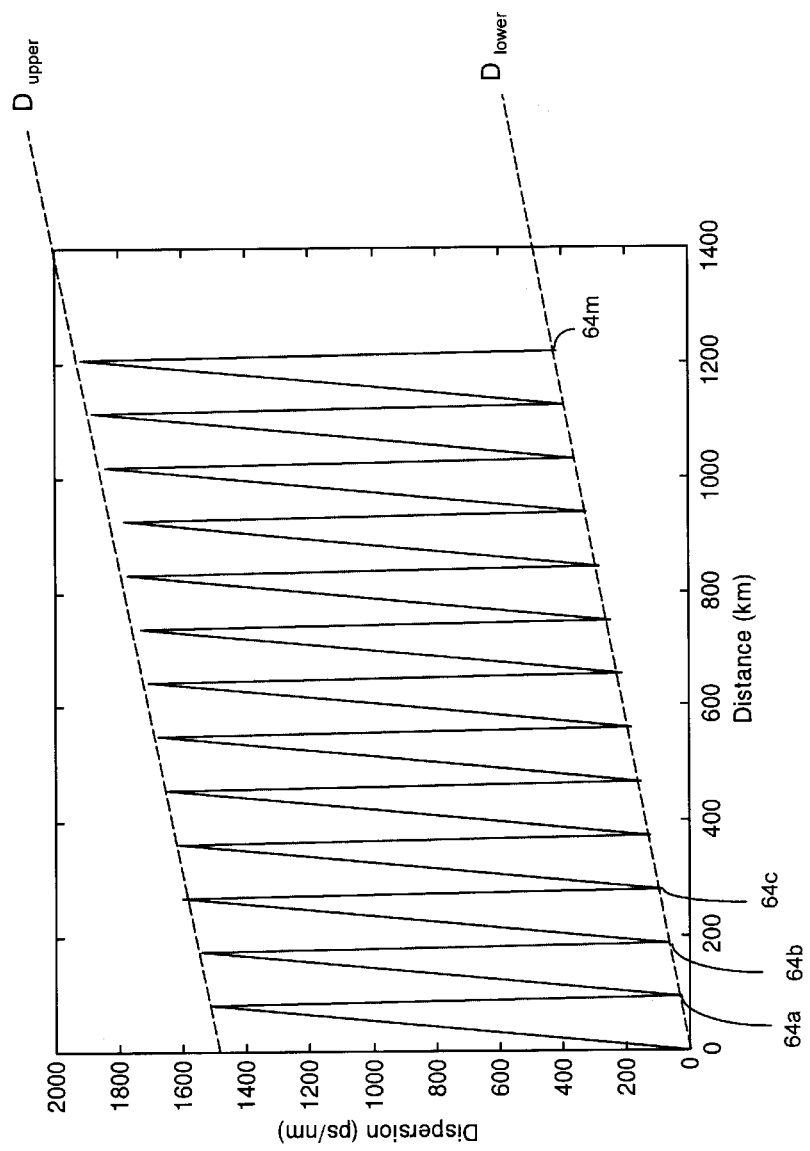
FIG. 5 is a dispersion map of non-dispersion shifted fiber (NDSF) at a wavelength of 1593 nm.

FIG. 5 is a dispersion map of non-dispersion shifted fiber (NDSF) at 1593 nm wavelength. The standard deviations $\sigma_{upper}$ and $\sigma_{lower}$ are non-zero in order to balance SPM and ISI in a single channel system. The locations of maximum power (64a–64m) have different amounts of dispersion, thereby reducing ISI.

There are two major competing penalties in single channel systems:
Self-phase modulation (SPM)
Inter-symbol interference (ISI)
In order to minimize SPM, $\sigma_{upper}$ and $\sigma_{lower}$ should be minimized in the dispersion maps. However, in order to minimize ISI penalty, $\sigma_{upper}$ or $\sigma_{lower}$ should be increased, such that the number of high chirp points at high power is reduced in the system. The amount of ISI in the system depends on system parameters such as fiber type, pulse width, and amplifier spacing. For example, in a current 40 Gb/s polarization bit interleaved system having 80 km (i.e. $L_i$=80 km) amplifier spacing and 3 dBm power into the fiber, preferred dispersion maps for high dispersion fiber (e.g. NDSF) have some ISI penalty, while preferred dispersion maps for low dispersion fibers (e.g. TWC fibers) have very little ISI penalty.

FIG. 4 and FIG. 5 are, respectively, preferred dispersion maps for single-channel systems with small and large ISI effects. The length $l_i$ of dispersion compensating fiber depends on the type of non-dispersion compensating fiber, shown as optical medium 14 in FIG. 1. For TWC fiber of length $L_i$=80 km, the DCM would typically have a length $l_i$=3 km, while for NDSF fiber of length $L_i$=80 km the DCM would typically have a length $l_i$=20 km.

Figure 6:
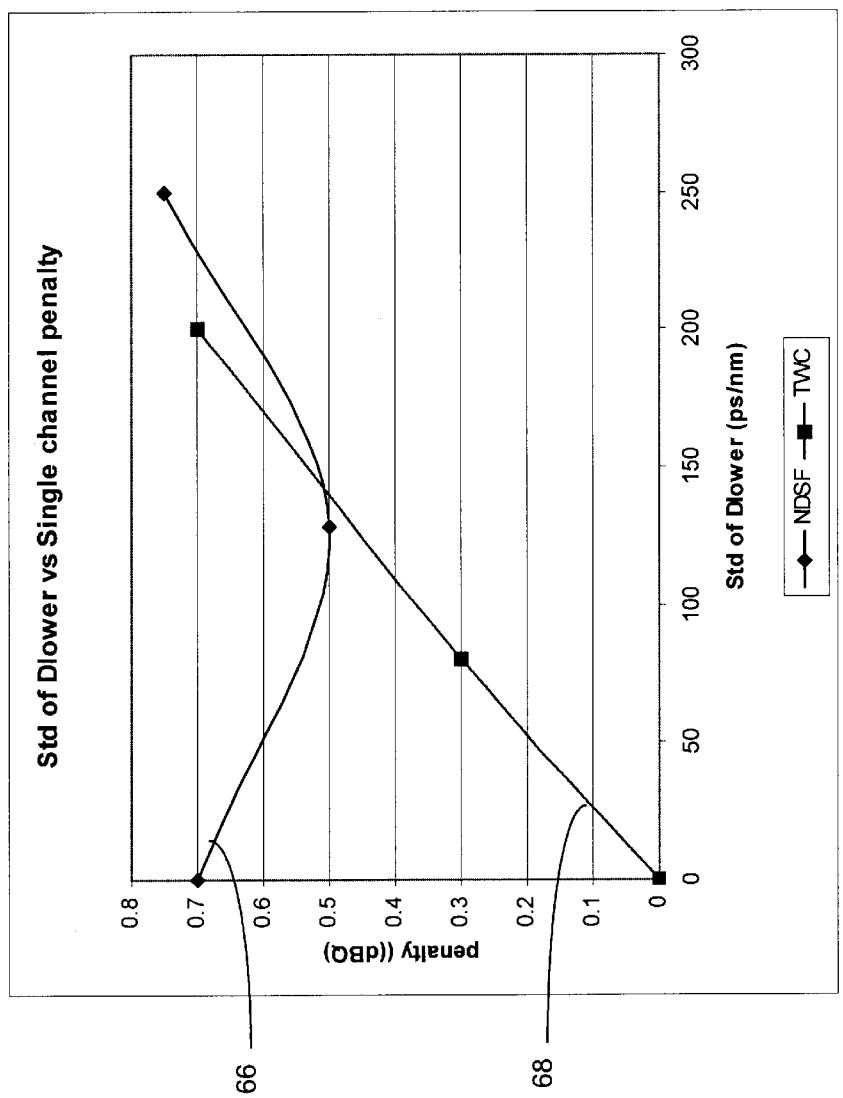
FIG. 6 is a graph comparing the single channel system penalty of the dispersion maps in FIGS. 4 and 5 in terms of Q-value expressed in decibels (dBQ)

FIG. 6 is a graph comparing the single channel system penalty, in terms of Q-value expressed in decibels (dBQ), of the dispersion maps in FIGS. 4 and 5. As shown in FIG. 6, single-channel penalties (66,68) increase as $\sigma_{lower}$ (i.e. Std of $D_{lower}$ in FIG. 6) deviates from its optimum value. The optimum value of $\sigma_{upper}$ and $\sigma_{lower}$ for TWC fiber (68) is zero, as shown in FIG. 4, whereas the optimum value is non-zero for NDSF (66), as shown in FIG. 5. Note that in FIG. 6 there is a minimum in penalty, in terms of reduced dBQ, for NDSF fiber when $\sigma_{lower}$ is about 130 ps/nm. This is because a non-zero value of $\sigma_{lower}$ and $\sigma_{upper}$, tends to balance the adverse effects of SPM and ISI. With TWC fiber, the single channel penalty increases as $\sigma_{lower}$ and $\sigma_{upper}$ (not shown), increase.

Now considering the effect of XPM in a WDM system, preferred dispersion maps for multi-channel systems would satisfy the following conditions:
a) An even distribution of minimum dispersion values, that is, locations 64a–64m along the line $D_{lower}$. The values would range from zero to a maximum of $D_{lower}$, since this distribution minimizes XPM. Simulations can be used to obtain the maximum of $D_{lower}$, which is proportional to the dispersion of the fiber.
b) None or only a minimum number of duplications in values of minimum dispersion, that is, locations 64a–64m along the line $D_{lower}$. This distribution is preferred in order to minimize XPM, since XPM is highest when the DCM 16 of a span 12 brings dispersion back to the same value.

Figure 7:
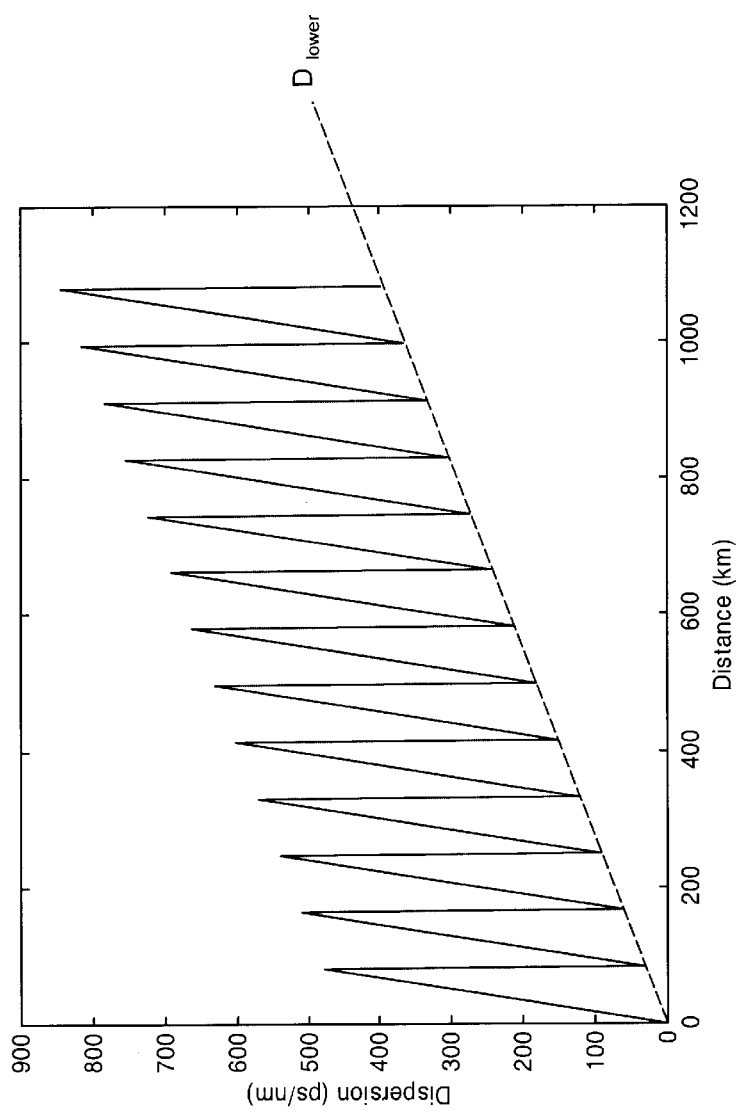
FIG. 7 is a dispersion map at a wavelength of 1600 nm for the multi-channel system of FIG. 1 using TWC fibers.

FIG. 7 is a dispersion map at a wavelength of 1600 nm for the multi-channel system of FIG. 1 using TWC fiber. Note that the slope of the line $D_{lower}$ is positive, i.e. the values of minimum dispersion are increasing with increasing distance along the link 11.

Figure 8:
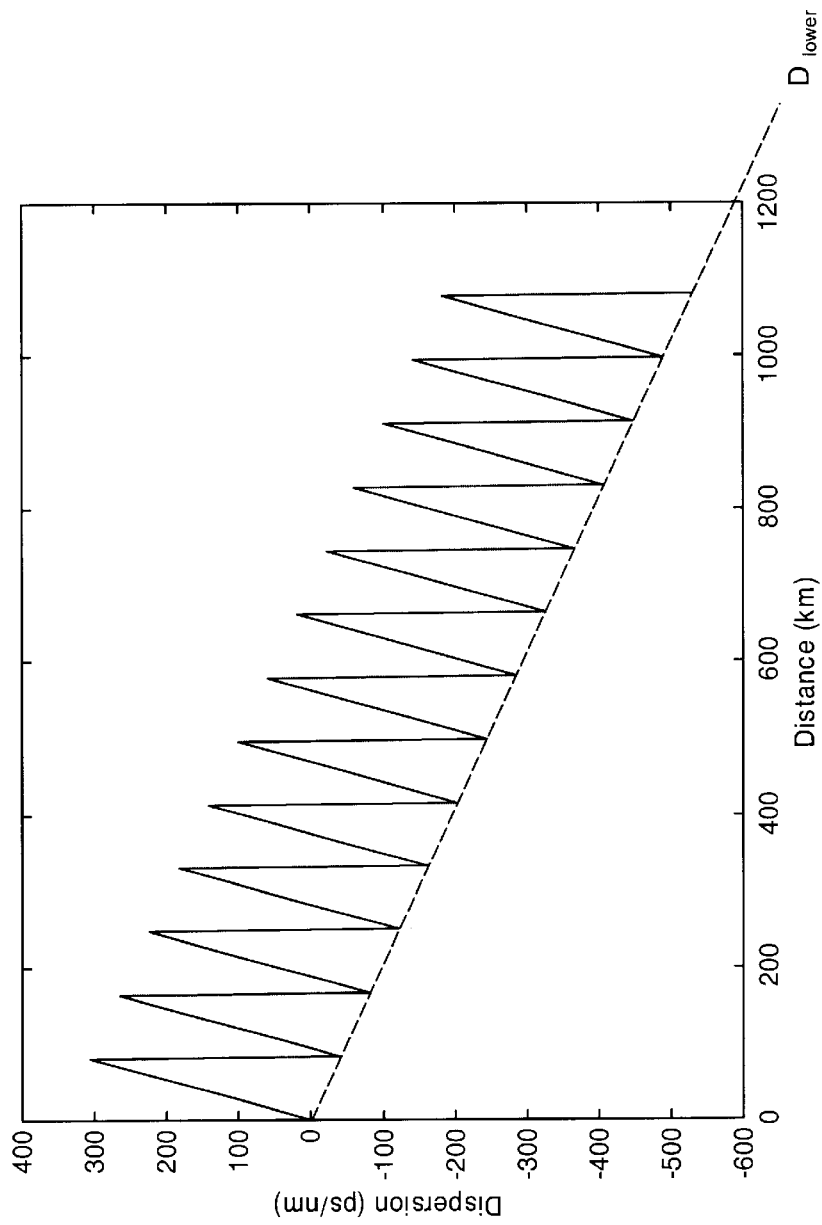
FIG. 8 is a dispersion map for the system of FIG. 1, with the same fiber and DCM configuration of FIG. 7, but at a wavelength of 1570 nm.

FIG. 8 is a dispersion map for the system of FIG. 1, with the same fiber and DCM configuration of FIG. 7, but at a wavelength of 1570 nm. Note that the slope of $D_{lower}$ is negative, that is, the values of minimum dispersion are decreasing with increasing distance along the link 11.

Figure 9:
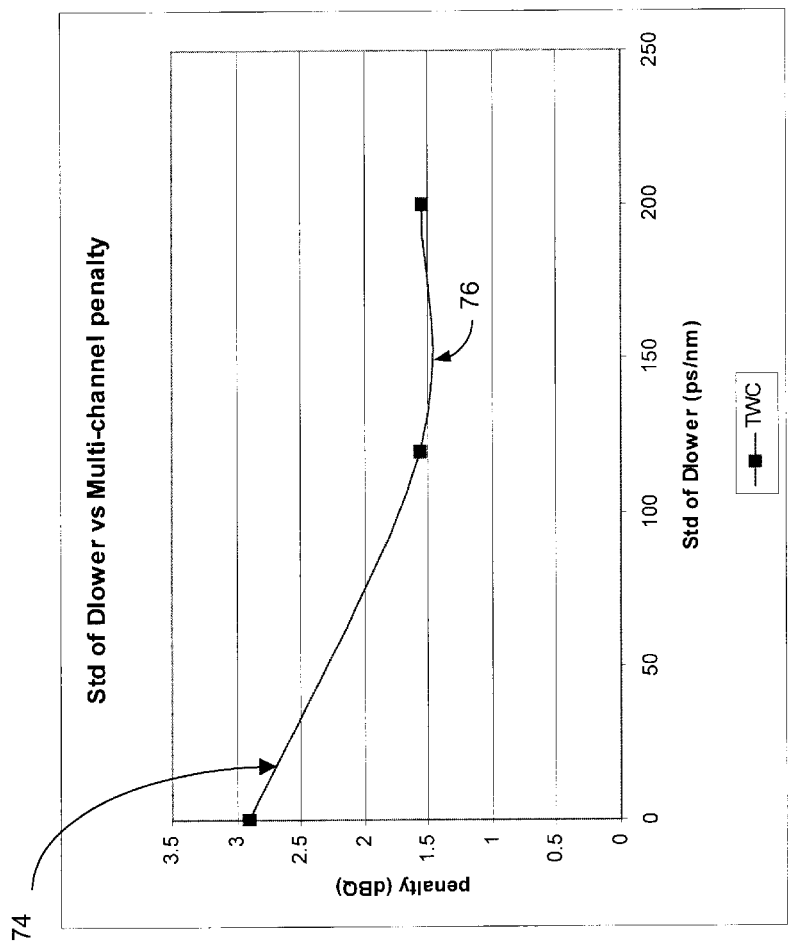
FIG. 9 is a graph of system penalty, in terms of dBQ, versus the standard deviation of the minimum dispersion points of different dispersion maps.

FIG. 9 is a graph of system penalty, in terms of dBQ, versus $\sigma_{lower}$ (i.e. Std of $D_{lower}$ in FIG. 9) of different dispersion maps, which are similar in shape to that of FIG. 7. It should be noted from FIG. 9 that the penalty 74 imposed on a multi-channel system due to XPM effects, first decreases as $\sigma_{lower}$ increases, and eventually levels off as $\sigma_{lower}$ is increased further beyond a certain threshold value 76. In FIG. 9 this threshold value 76 is approximately at $\sigma_{lower}$=125 ps/nm.

Figure 10:
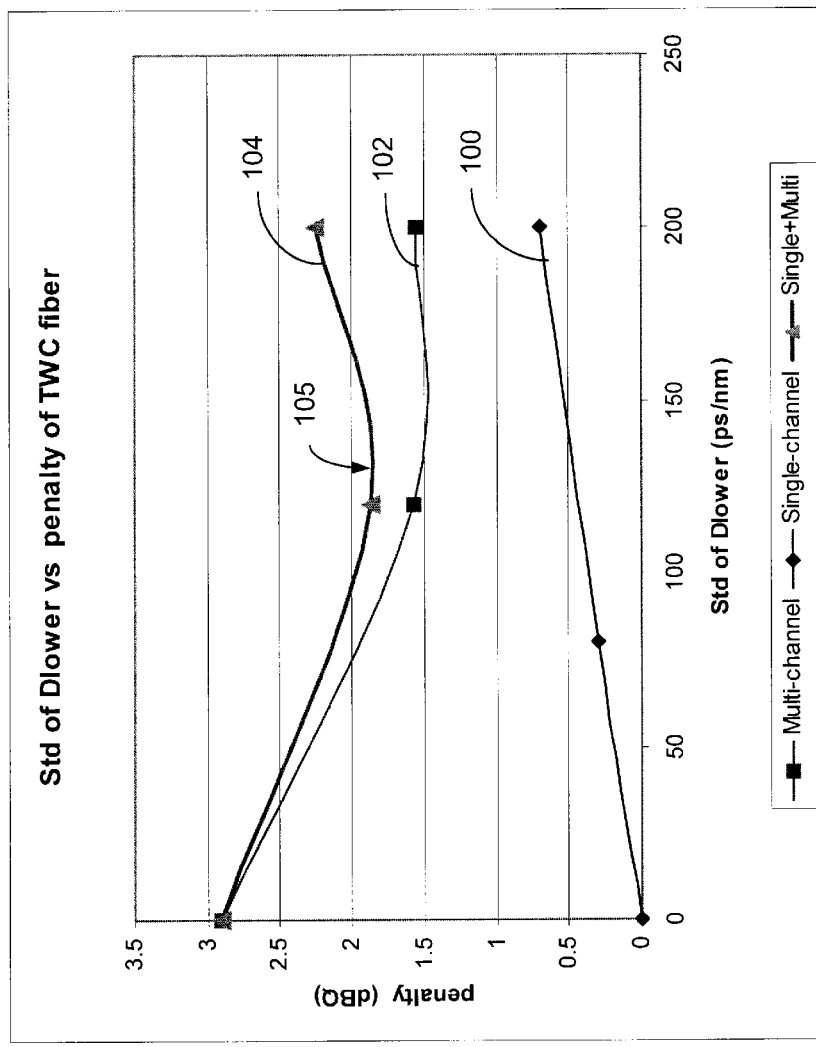
FIG. 10 is a graph comparing system penalties, in terms of dBQ, between single-channel and multi-channel systems.

FIG. 10 is a graph comparing system penalties, in terms of dBQ, between single-channel and multi-channel systems. In general, single-channel penalties 100 increase as $\sigma_{upper}$ and $\sigma_{lower}$ (i.e. Std of $D_{lower}$ in FIG. 10) increase, while multi-channel penalties 102 decrease as $\sigma_{upper}$ and $\sigma_{lower}$ increase. This is shown by curves 100 and 102, respectively in FIG. 10. FIG. 10 shows the overall penalty 104, which is a combination of single-channel and multi-channel penalties, as a function of $\sigma_{lower}$. For a given wavelength, the minimum overall penalty 105 occurs at some non-zero $\sigma_{upper}$ and $\sigma_{lower}$.

As previously mentioned, dispersion maps vary with wavelength. Due to residual slope of the system, the profile of $D_{lower}$ and $D_{upper}$ can change significantly. Consequently, a dispersion map that is preferred at one wavelength may not be preferred for another wavelength. FIGS. 4, 7, and 8 are dispersion maps for the same link, having the same fibers and DCMs, but evaluated at different wavelengths. In a WDM system, every wavelength will have a different set of similar penalty curves as shown in FIG. 10. A given link can have the best dispersion map at one wavelength but the worst map at some other wavelength, especially when the residual slope is large.

Figure 11:
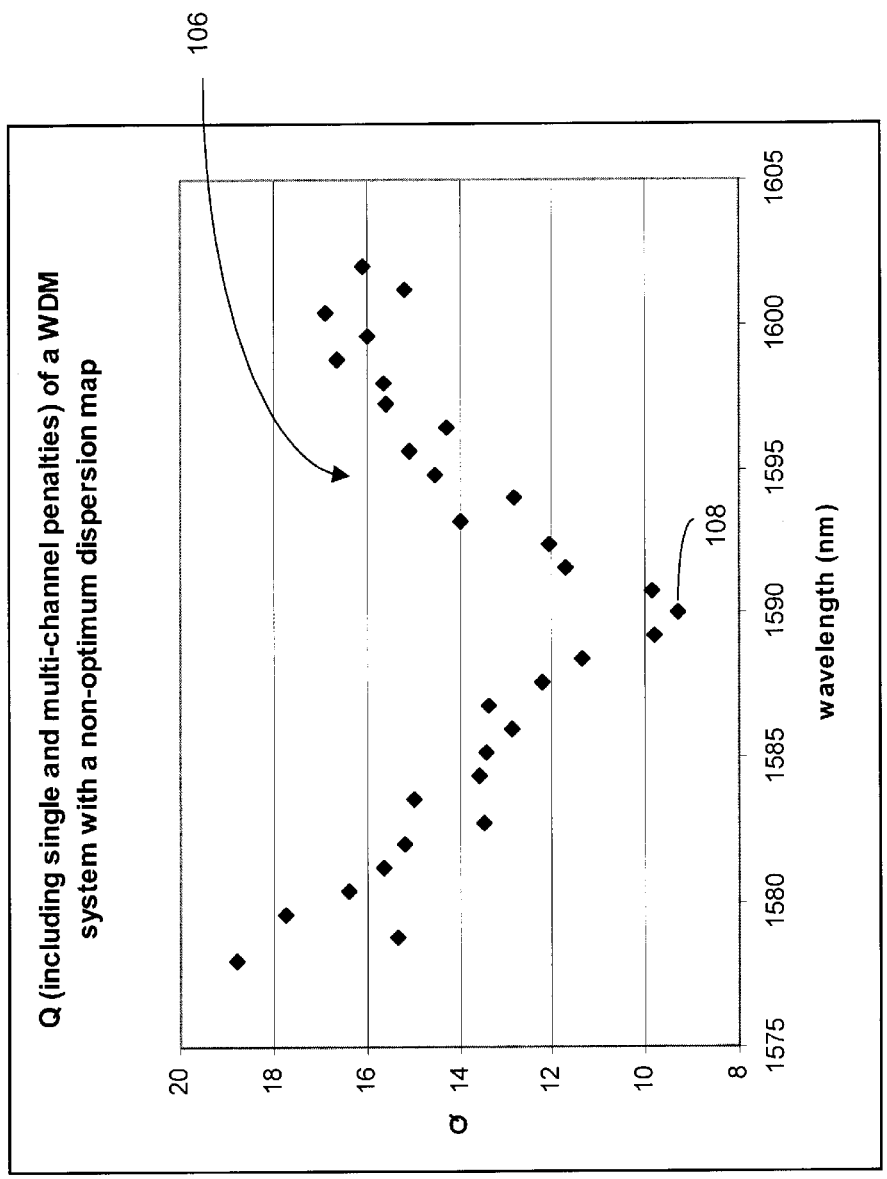
FIG. 11 is a graph of the overall system penalties, across the range of channels for the WDM system of FIG. 1, using the dispersion map of FIG. 4.

FIG. 11 is a graph of the overall system penalties, across the range of wavelengths for the WDM system of FIG. 1, using the dispersion map of FIG. 4. The set of overall penalties 106, in terms of Q-value, are shown for the multi-channel system in the case of large residual slope. That is, less than 70% match in the slope of the dispersion map over the range of WDM wavelengths, which in this case is from 1578 nm to 1603 nm. The channel at 1590 nm wavelength experiences the maximum combined effect of SPM, ISI and XPM penalties within the range of WDM wavelengths. That is, the channel at 1590 nm has the minimum Q-value 108 of all the wavelengths in the range.

When there is a good RDS match, typically better than 85% match, the dispersion map shape remains relatively constant over the WDM wavelength range. Typically, selection of a preferred dispersion map can be done by adjusting $D_{upper}$ and $D_{lower}$ to achieve a balance between single and multi-channel penalties at one wavelength, usually the center wavelength of the WDM wavelength range.

Figure 12:
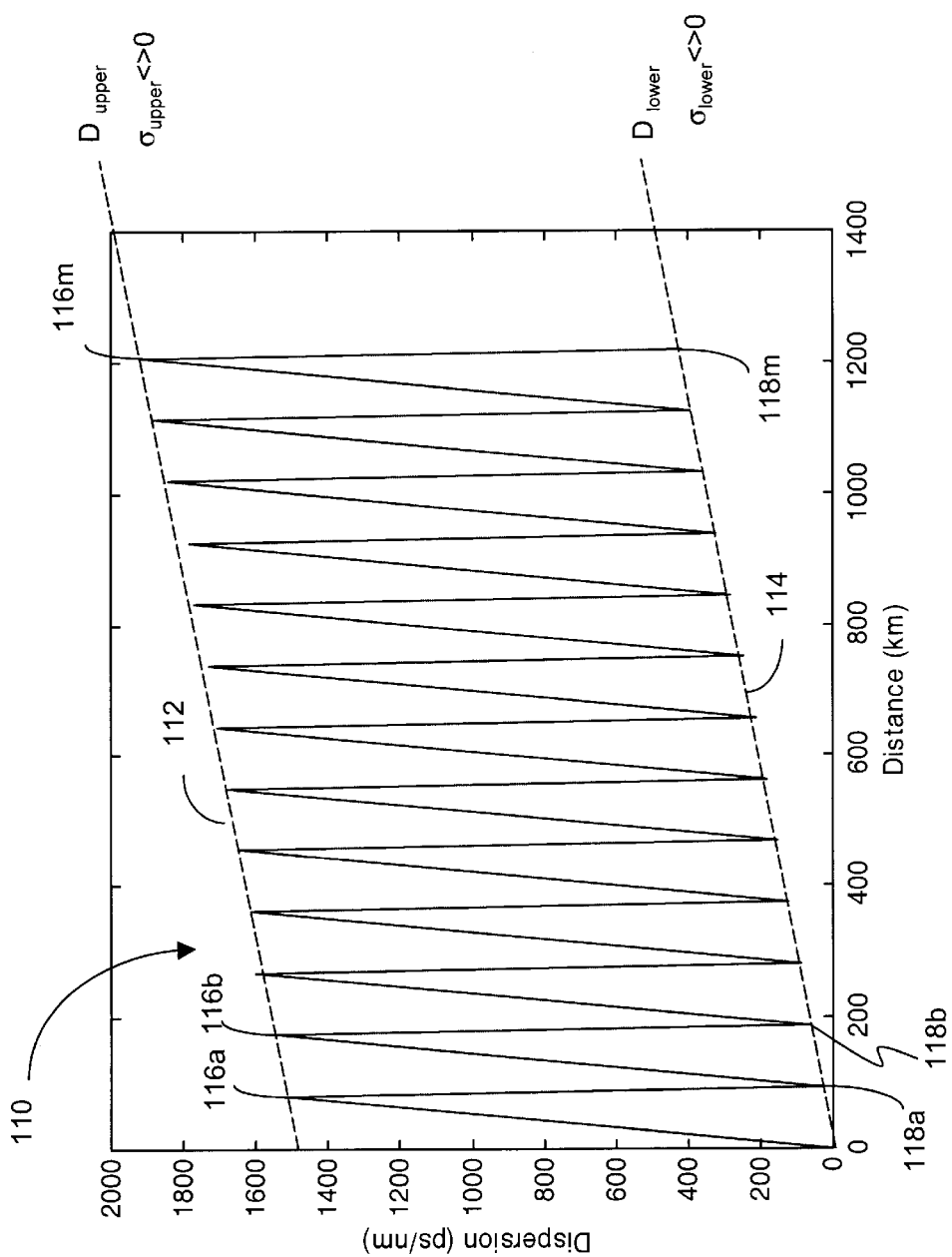
FIG. 12 is a ramp type dispersion map of a dispersion managed link that is in accordance with a first embodiment of the invention.

FIG. 12 is a ramp type dispersion map 110 of the dispersion managed link 11, according to a first embodiment of the invention, using NDSF fiber and modelled at a wavelength of 1590 nm. The locations of maximum dispersion 116a–116m are distributed along an upper limit 112, represented by the dashed line labelled $D_{upper}$, which is linear and has a positive slope. Thus, the amount of dispersion at the locations of maximum dispersion 116a–116m is increasing with distance along the link 11. It follows that $\sigma_{upper}$ is non-zero. Similarly, the locations of minimum dispersion 118a–118m are distributed along a lower limit 114, represented by the dashed line labelled $D_{lower}$, which is also linear and has a positive slope. Thus, the amount of dispersion at the locations of minimum dispersion 118a–118m is also increasing with distance along the link 11. It also follows that lower is non-zero.

FIG. 12 shows that the distributions of maximum dispersions (i.e. upper limit 112) and minimum dispersions (i.e. lower limit 114) are changing in accordance with one another for changes in location along the link 11.

Figure 13:
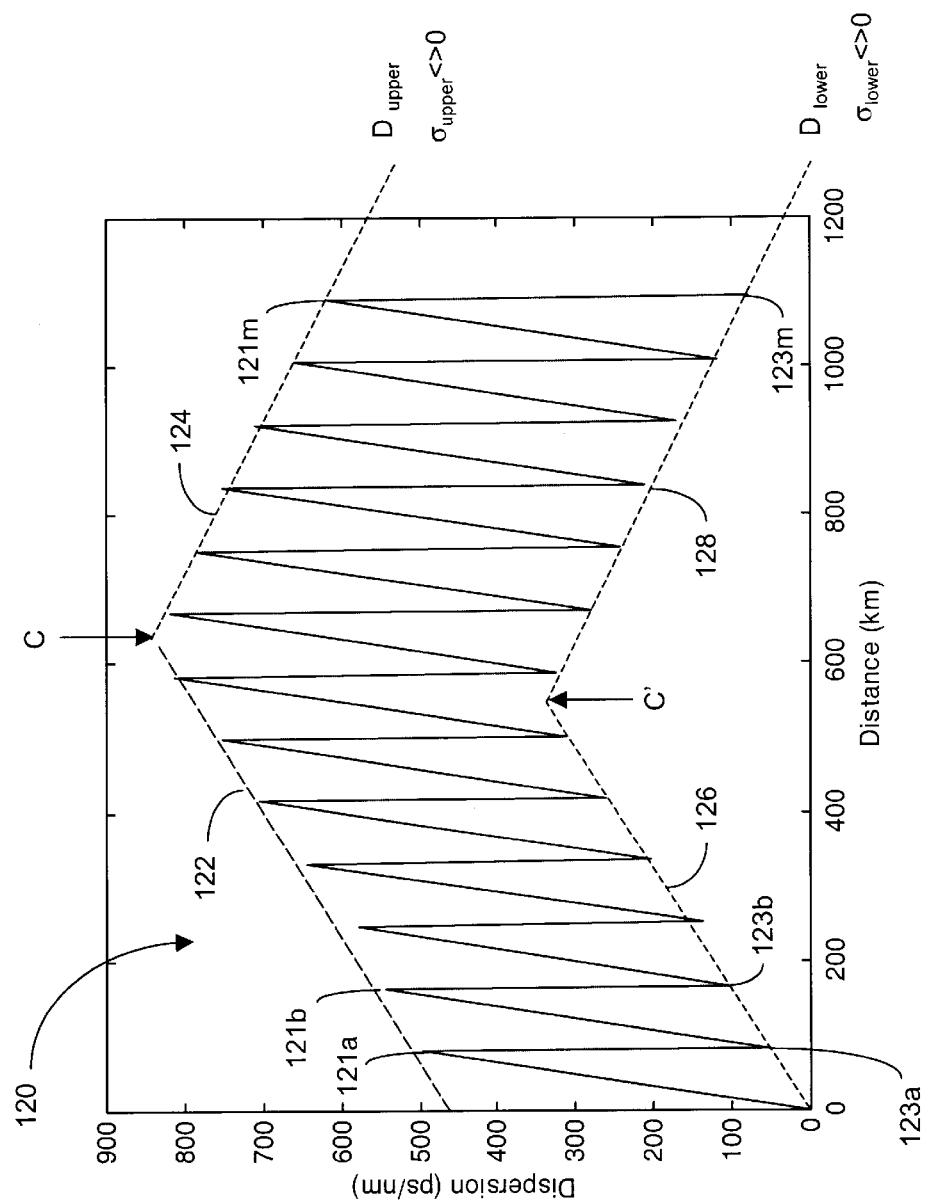
FIG. 13 is an angular type dispersion map of a dispersion managed link that is in accordance with a second embodiment of the invention.

FIG. 13 is an angular type dispersion map 120 of the dispersion managed link 11, according to a second embodiment of the invention, using NDSF fiber and modelled at a wavelength of 1590 nm. The profiles of both the $D_{upper}$ and $D_{lower}$ are angular shapes, with their maximums being near a midway location along the link. The standard deviations $\sigma_{upper}$ and $\sigma_{lower}$ are non-zero. The locations of maximum dispersion 121a–121m are distributed along an upper limit having a positively sloped portion 122 and a negatively sloped portion 124. The upper limit is represented by the dashed line labelled $D_{upper}$, and has a point, labelled C, approximately midway along the link 11 about which the upper limit is generally symmetrical. Thus, the amount of dispersion at the locations of maximum dispersion 121a–121m is increasing with distance before the midway point C and decreasing with distance thereafter. It follows that $\sigma_{upper}$ is non-zero. Similarly, the locations of minimum dispersion 123a–123m are distributed along a lower limit having a positively sloped portion 126 and a negatively sloped portion 128. The lower limit is represented by the dashed line labelled $D_{lower}$, and has a point, labelled C', approximately midway along the link 11 about which the lower limit is generally symmetrical. Thus, the amount of dispersion at the locations of minimum dispersion 123a–123m is increasing with distance before the midway point C' and decreasing with distance thereafter. It follows that $\sigma_{lower}$ is non-zero.

FIG. 13 shows that the distributions of maximum dispersion and minimum dispersion have portions (122 and 126, 124 and 128) where the maximum dispersions are changing in accordance with the minimum dispersions for changes in location along the link 11.

Figure 14:
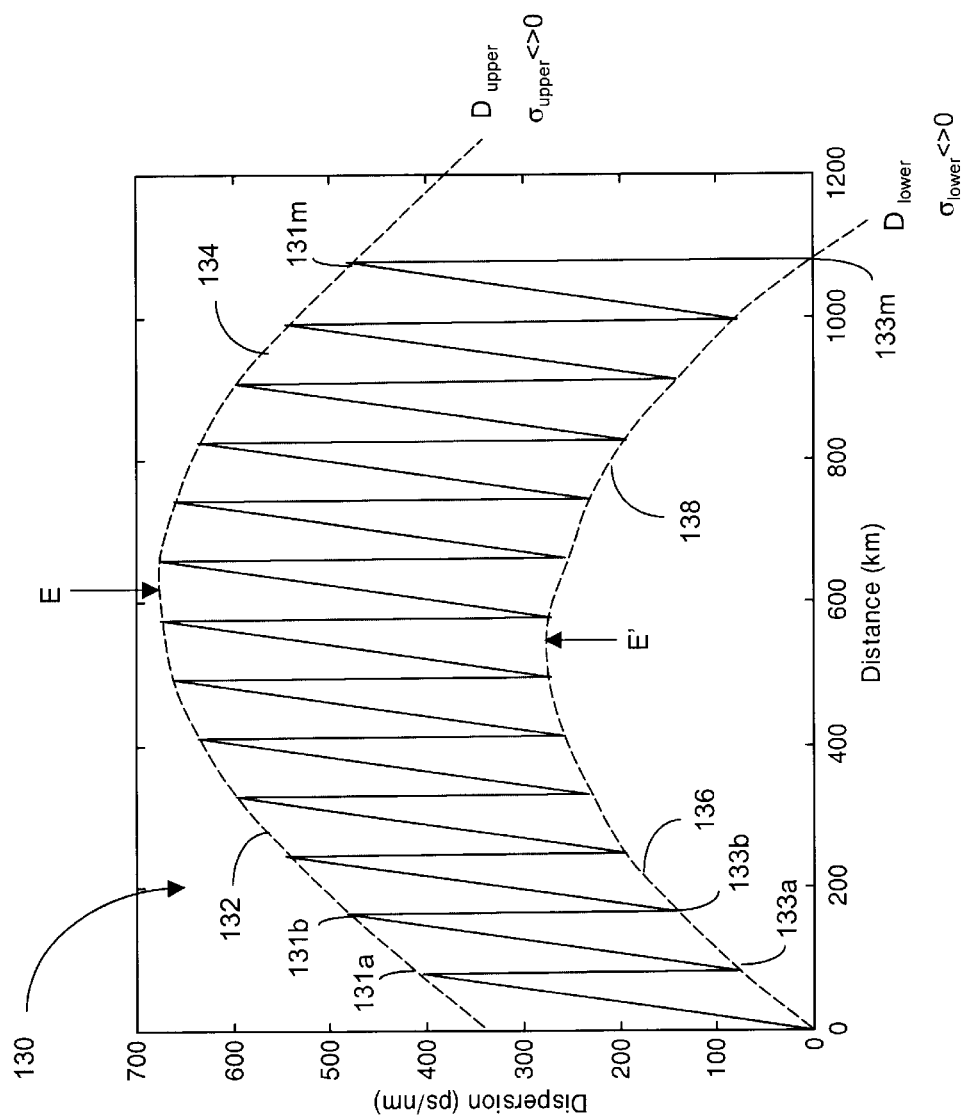
FIG. 14 is an arcuate type dispersion map of a dispersion managed link that is in accordance with a third embodiment of the invention.

FIG. 14 is an arcuate type dispersion map 130 of the dispersion managed link 11, according to a third embodiment of the invention, using TWC fiber and modelled at a center wavelength of 1590 nm. The locations of maximum dispersion 131a–131m are distributed along an upper limit having a positively sloped curved portion 132 and a negatively sloped curved portion 134, the two portions 132, 134 forming an arcuate line. The upper limit is represented by the dashed line labelled $D_{upper}$, and has a point, labelled E, approximately midway along the link 11 about which the upper limit is generally symmetrical. Thus, the amount of dispersion at the locations of maximum dispersion 131a–131m is increasing with distance before the midway point E and decreasing with distance thereafter. It follows that $\sigma_{upper}$ is non-zero. Similarly, the locations of minimum dispersion 133a–133m are distributed along a lower limit having a positively sloped curved portion 136 and a negatively sloped curved portion 138, the two portions 136, 138 forming an arcuate line. The lower limit is represented by the dashed line labelled $D_{lower}$, and has a point, labelled E', approximately midway along the link 11 about which the lower limit is generally symmetrical. Thus, the amount of dispersion at the locations of minimum dispersion 133a–133m is increasing with distance before the midway point E' and decreasing with distance thereafter. It follows that $\sigma_{lower}$ is non-zero.

FIG. 14 shows that the distributions of maximum dispersion and minimum dispersion have portions (132 and 136, 134 and 138) where the maximum dispersions are changing in accordance with the minimum dispersions for changes in location along the link 11.

When there is a poor RDS match in a transmission link, dispersion map shapes vary significantly over the WDM wavelength range. The selection of a preferred dispersion map is done by evaluating the shape of the map at several wavelengths, typically near the ends and the center of the wavelength range. A trade off on the shape of the dispersion maps should be made between all the wavelengths in the range.

One way to compensate poor RDS match is to reduce the wavelength bandwidth, which can reduce the variation of the dispersion maps over the wavelength range. In this case, the selection of a preferred dispersion map is similar to that of the case with good RDS match.

Figure 15:
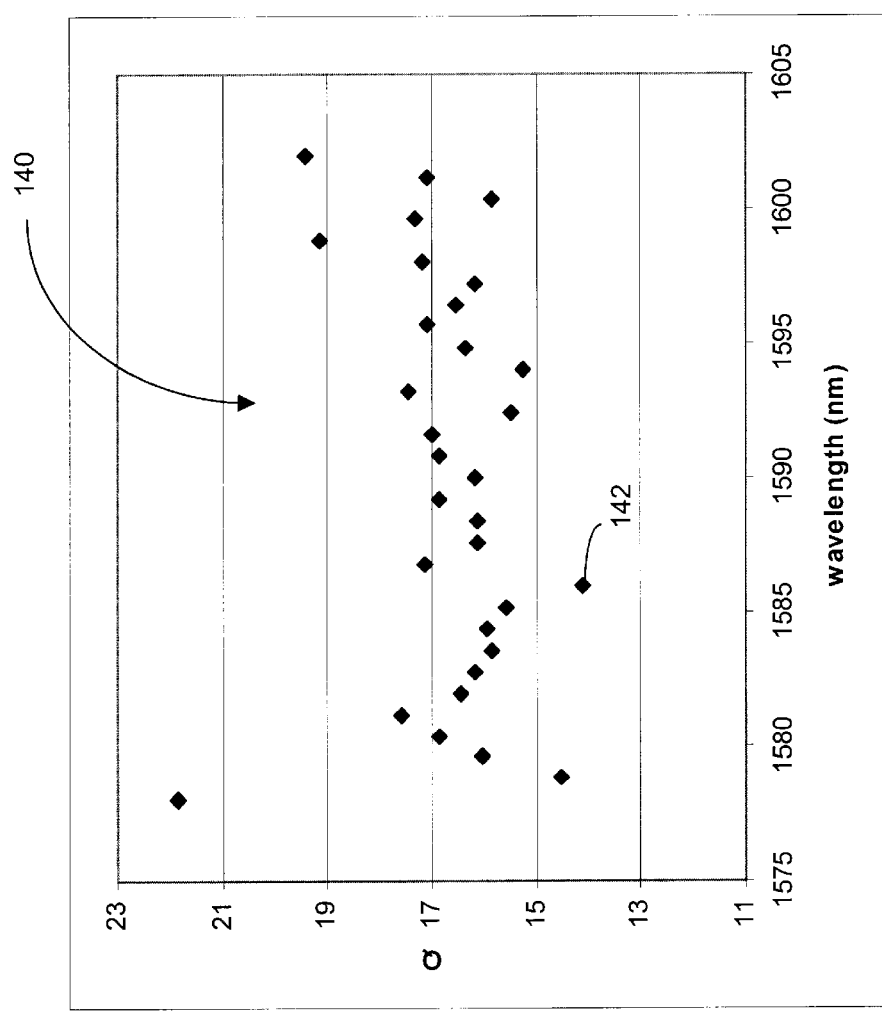
FIG. 15 is a graph of the overall system penalties for the dispersion map of FIG. 14.

FIG. 15 graphs the overall penalties 140 of the dispersion map shown in FIG. 14. The wavelength range is reduced from 1578 nm to 1602 nm rather than the full L-band range. In this case the maximum combined effect 142 of single-channel and multi-channel penalties in the wavelength range occurs at a wavelength of 1586 nm. In comparing to the dispersion map shown in FIG. 7, there is a 2.2 dBQ improvement using the arcuate type dispersion map of FIG. 14 at the center wavelength 1590 nm.

When poor RDS match combines with a larger wavelength bandwidth, e.g. 1570 nm to 1615 nm, selection of a preferred dispersion map becomes more difficult. What is desired is to have enough $\sigma_{upper}$ and $\sigma_{lower}$ to reduce the multi-channel penalty at the center wavelength, while keeping the $\sigma_{upper}$ and $\sigma_{lower}$ to a minimum in order to control the growth of $\sigma_{upper}$ and $\sigma_{lower}$ at the end wavelengths. For a poor RDS matched WDM system, to characterize the dispersion map by the center wavelength the following rules of thumb apply:

Ramp type of dispersion map is not suitable, due to its asymmetrically response to end-wavelength changes.

Penalties of the end channels increase faster for angular type than arcuate type of maps.

In the case of angular or arcuate types of maps, when the end-channel penalties are dominated by single channel penalties, dispersion maps with multiple peaks should be used.

Figure 16:
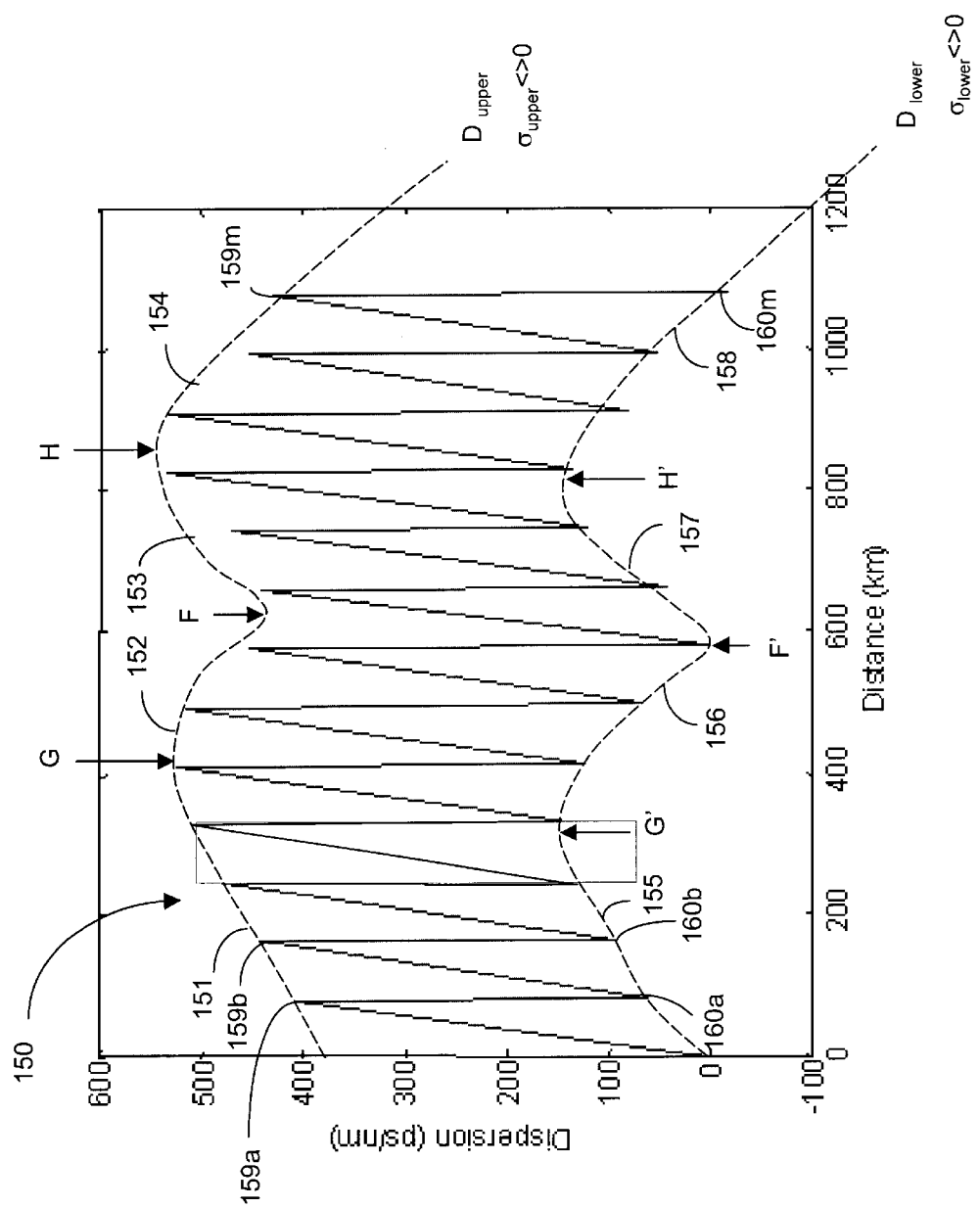
FIG. 16 is an arcuate type dispersion map of a dispersion managed link that is in accordance with a fourth embodiment of the invention.
Figure 17:
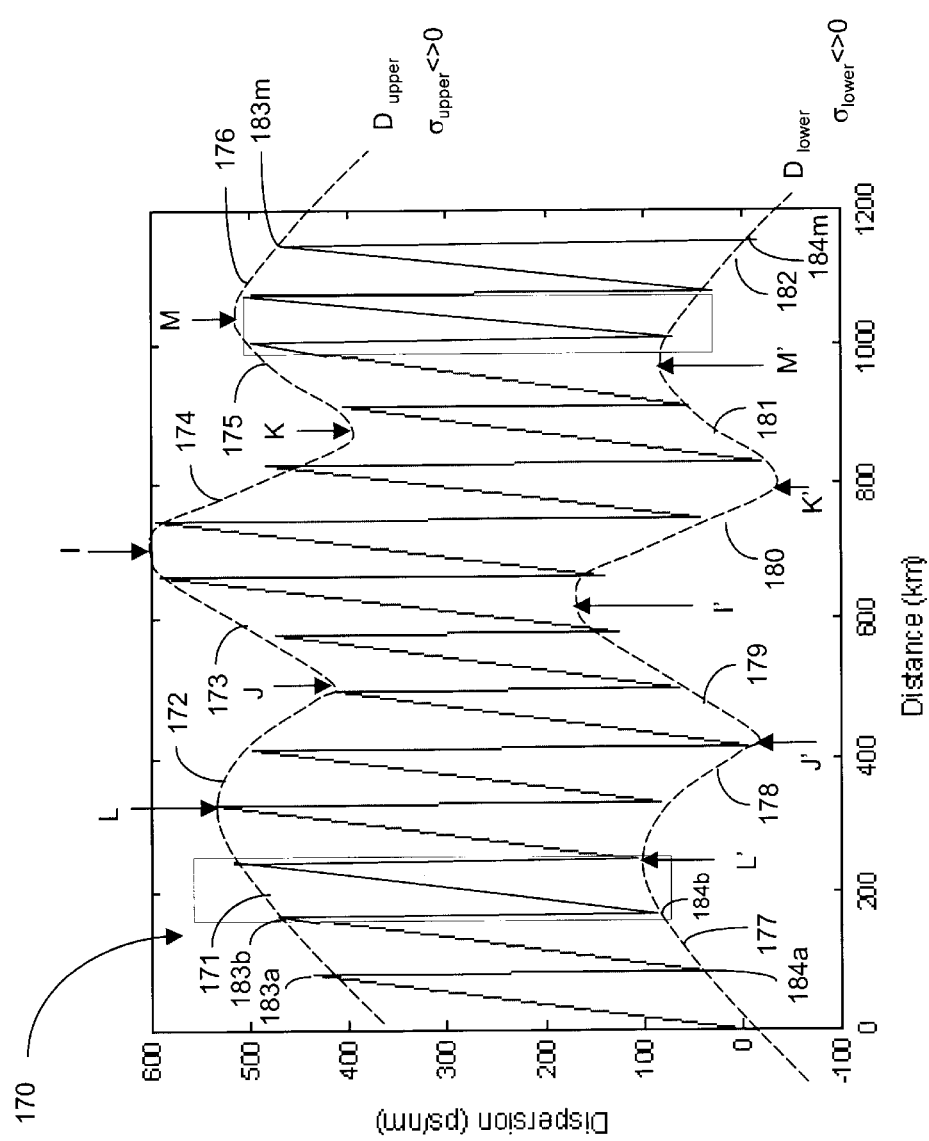
FIG. 17 is an arcuate type dispersion map of a dispersion managed link that is in accordance with a fifth embodiment of the invention.

FIG. 16 and FIG. 17 are examples of preferred dispersion maps at the center wavelength. The goal is to obtain uniformity in overall penalties across the whole wavelength range, as shown in FIG. 15.

FIG. 16 is a two-peaked arcuate type dispersion map 150 of the dispersion managed link 11, according to a fourth embodiment of the invention, in the case of poor RDS match and large wavelength bandwidth and modelled at a center wavelength of 1590 nm. The locations of maximum dispersion 159*a*–159*m* have amounts of dispersion that are distributed along an upper limit having a succession of alternating positively 151, 153 and negatively 152, 154 sloped curved portions so as to form two maximums G, H in the upper limit and be generally symmetrical about a midway point F in the link 11. The dashed line labelled $D_{upper}$ represents the upper limit and is a plot of the distribution of maximum dispersions versus distance along the link 11. The amount of dispersion at the locations of maximum dispersion 159*a*–159*m* is increasing with distance before the first maximum G in the upper limit and between the midway point F and the second maximum H in the upper limit. Also, the amount of dispersion at the locations of maximum dispersion 159*a*–159*m* is decreasing with distance after the second maximum H in the upper limit and between the midway point F and the first maximum G in the upper limit. It follows that $\sigma_{upper}$ is non-zero.

Similarly in FIG. 16, the locations of minimum dispersion 160*a*–160*m* have amounts of dispersion that are distributed along a lower limit having a succession of alternating positively 155, 157 and negatively 156, 158 sloped curved portions so as to form two maximums G', H' in the lower limit and be generally symmetrical about a midway point F' in the link 11. The dashed line labelled $D_{lower}$ represents the lower limit and is a plot of the distribution of minimum dispersions versus distance along the link 11. The amount of dispersion at the locations of minimum dispersion 160*a*–160*m* is increasing with distance before the first maximum G' in the lower limit and between the midway point F' and the second maximum H' in the lower limit. Also, the amount of dispersion at the locations of minimum dispersion 160*a*–160*m* is decreasing with distance after the second maximum H' in the lower limit and between the midway point F' and the first maximum G' in the lower limit. It follows that $\sigma_{lower}$ is non-zero.

FIG. 16 shows that the distributions of maximum dispersion and minimum dispersion have portions (151 and 155, 152 and 156, 153 and 157, 154 and 158) where the maximum dispersions are changing in accordance with the minimum dispersions for changes in location along the link FIG. 17 is a three-peaked arcuate type dispersion map 170 of the dispersion managed link 11, according to a fifth embodiment of the invention, in the case of poor RDS match and large bandwidth and modelled at a center wavelength of 1590 nm. The locations of maximum dispersion 183*a*–183*m* are distributed along an upper limit having a succession of alternating positively (171,173,175) and negatively (172,174, 176) sloped curved portions so as to form three maximums L, I, M in the upper limit and be generally symmetrical about the second maximum I in the upper limit which is also the midway point in the link 11. The dashed line labelled $D_{upper}$ represents the upper limit. The amount of dispersion at the locations of maximum dispersion 183*a*–183*m* is increasing with distance in the positively sloped portions (171,173,175) of the upper limit and decreasing with distance in the negatively sloped portions (172,174,176) of the upper limit. It follows that $\sigma_{upper}$ is non-zero.

Similarly in FIG. 17, The locations of minimum dispersion 184*a*–184*m* are distributed along a lower limit having a succession of alternating positively (177,179,181) and negatively (178,180,182) sloped curved portions so as to form three maximums L', I', M' in the lower limit and be generally symmetrical about the second maximum I' in the lower limit which is also the midway point in the link 11. The dashed line labelled $D_{lower}$ represents the lower limit. The amount of dispersion at the locations of minimum dispersion 184*a*–184*m* is increasing with distance in the positively sloped portions (177,179,181) of the lower limit and decreasing with distance in the negatively sloped portions (178,180,182) of the lower limit. It follows that $\sigma_{lower}$ is non-zero.

FIG. 17 shows that the distributions of maximum dispersion and minimum dispersion have portions (171 and 177, 172 and 178, 173 and 179, 174 and 180, 175 and 181, 176 and 182) where the maximum dispersions are changing in accordance with the minimum dispersions for changes in location along the link 11.

Figure 18:
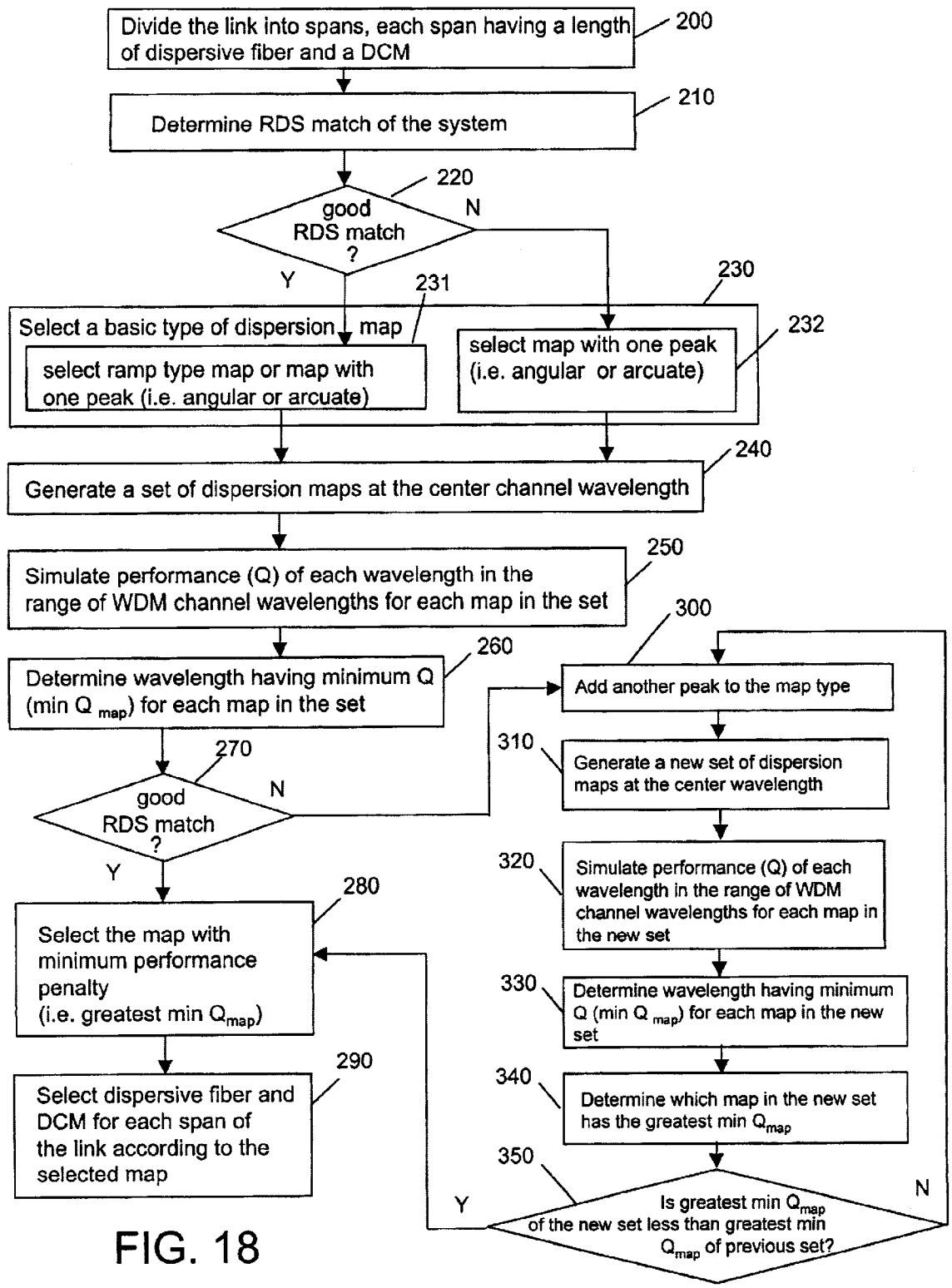
FIG. 18 is a flowchart of a method of providing a dispersion managed link according to a sixth embodiment of the invention.

FIG. 18 is a flowchart of a method of providing a dispersion managed link that minimizes the maximum combined effects of SPM, ISI, and XPM within a range of predetermined WDM wavelengths, according to a seventh embodiment of the invention.

The method will now be explained in detail below. In step 200, the link 11 is divided into spans 12, each span 12 having a length of optically dispersive fiber 14 and a DCM 16. In the next step 210, the RDSs of the transmission fiber and DCMs are determined at the center wavelength of the WDM system 10. In the next step 220, if the RDSs are matched within 85% then the system 10 has a good RDS match.

A selection of basic type of dispersion map (e.g. FIGS. 12-14) is made next, step 230, in dependence upon the RDS match. If the RDS match is good, any one of the three basic types (i.e. ramp, angular, or arcuate type) of maps is selected 231, otherwise a map with one or more peaks, or maxima, in the upper $D_{upper}$ and lower $D_{lower}$ dispersion limits, is selected (e.g. FIGS. 13 and 14). The term peaks, or peaked, is used to refer to maxima in the dispersion maps, and these peaks can be either pointed, as in the case of angular type maps, or rounded as in the case of arcuate type maps.

The next step 240 is to generate a set of dispersion maps for the center wavelength of the wavelength range such that the maximum, or maxima, of $D_{lower}$ varies in approximately 50 ps/nm steps. In the case of ramp type dispersion maps the maximum of the lower dispersion limit $D_{lower}$ will be on either one end or the other of the map. The step size of approximately 50 ps/nm is somewhat arbitrary, and represents a trade-off between simulation time and accuracy. It is feasible to adapt an iterative approach, which would use a coarse step size for the first pass and smaller step sizes for subsequent passes, eventually converging on a preferred dispersion map.

The next step 250 is to simulate the performance, in terms of Q-value of transmitted signals, of each wavelength in the wavelength range and for each dispersion map in the set of maps generated in the previous step 240. This simulation is done using the models of the system 10 described earlier with reference to FIG. 3.

The next step 260 is to determine the wavelength having the minimum Q-value (min $Q_{map}$) for each map in the set. Or stated another way, the wavelength having the maximum combined effect of SPM, ISI, and XPM penalties is determined for each map in the set.

If there is good RDS match (step 270), as determined above, the next step 280 is to select the map with the minimum performance penalty. That is, the map with the greatest min $Q_{map}$, or alternately stated, the map that minimizes the maximum combined effect of SPM, ISI, and XPM, is selected. The next step 290 is to select the dispersive fibers 14 and DCMs 16 for each span 12 according to the selected map.

If the RDS match is not good, then a new set of maps with an additional peak (step 300) is generated (step 310), the performance of each wavelength in the range is simulated for the maps in the new set (step 320), and the min $Q_{map}$ for each map in the new set is determined (step 330). This amounts to repeating the steps of generating 240, simulating 250 and determining 260, described above in more detail. The next step 340 is to determine the map with the minimum performance penalty. That is, the map with the greatest min $Q_{map}$ is identified. Then, in step 350, it is determined whether the greatest min $Q_{map}$ of the new set is less than the greatest min $Q_{map}$ of the previous set. If so, then the step 280 of selecting the map with the minimum performance penalty (i.e. the map with the greatest min $Q_{map}$) is performed, followed by the step 290 of selecting dispersive fibers 14 and DCMs 16 according to the selected map. Otherwise, if the greatest min $Q_{map}$ of the new set is not less than the greatest min $Q_{map}$ of the previous set, another peak is added to the map type (step 300) and the method continues from the step of generating a new set of maps 310. Eventually the method will converge on a preferred dispersion map, which will be selected for the link 11.

For a system with poor RDS (less than 85% match), a dispersion map that results in good system performance (i.e. largest minimum Q within a given range) is usually a map with one or more peaks. The height of the peak, the maximum of the lower dispersion limit $D_{lower}$, the number of peaks in the upper $D_{upper}$ and lower $D_{lower}$ dispersion limits, and the shape of the peak depend on several system parameters, such as fiber type, RDS match condition and wavelength bandwidth of the system. Shape of the peak is selected by recursive simulation over the wavelength range such that the conditions (a and b) discussed with respect to multi-channel systems are best satisfied.

Numerous alterations, variations and adaptations to the embodiments of the inventions described above are possible within the scope of the invention, which is defined by the claims.

What is claimed is:

1. A method of providing a dispersion managed link for a wavelength division multiplexed optical transmission system having a plurality of predetermined wavelengths one of which is a center wavelength, the link including a plurality of serially connected spans, each span having a length of optically dispersive fiber connected to a dispersion compensating module and being connected to an adjacent span by an optical amplifier, the method comprising the steps of:
   a. selecting one of a ramp dispersion map, angular dispersion map arcuate dispersion map for representing dispersion on the link;
   b. generating a set of dispersion maps, according to the selected dispersion map, at the center wavelength;
   c. simulating, for each dispersion map in the set, each wavelength to obtain a performance indicator of that wavelength;
   d. determining, for each dispersion map in the set, which one of the performance indicators is the minimum performance indicator;
   e. selecting the dispersion map with the greatest minimum performance indicator; and
   f. selecting dispersive fibers and dispersion compensating module for each span in accordance with the selected dispersion map.

2. The method of claim 1, further comprising a first step of determining the relative dispersion slope match of the system, and wherein the step a) of selecting is in dependence upon the relative dispersion slope match such that a peaked dispersion map that is one of an angular dispersion map or arcuate dispersion map is selected when the relative dispersion slope match is poor, which is a slope match of less than approximately eighty-five percent.

3. The method of claim 2, wherein the step d) of determining is in dependence upon the relative dispersion slope match such that when the relative dispersion slope match is poor the step further comprises the steps of:
   d1) adding another peak to the peaked dispersion map;
   d2) generating a new set of dispersion maps at the center wavelength
   d3) simulating, for each dispersion map in the new set, each wavelength to obtain a new performance indicator of that wavelength;
   d4) determining, for each dispersion map in the new set, which one o the new performance indicators is the new minimum performance indicator;
   d5) selecting the dispersion map in the new set with the greatest new minimum performance indicator; and
   d6) repeating the steps of d1) adding to d5) selecting in response to the greatest new minimum performance indicator of the new set not being less than the greatest minimum performance indicator of any previous set.

* * * * *